United States Patent [19]

King

[11] 4,116,834

[45] Sep. 26, 1978

[54] APPARATUS FOR INCREASING THE PH OF WASTE WATER

[75] Inventor: Earle Cochran King, Evans City, Pa.

[73] Assignee: Mine Safety Appliances Company, Pittsburgh, Pa.

[21] Appl. No.: 820,887

[22] Filed: Aug. 1, 1977

[51] Int. Cl.² .......................... C02B 1/18; C02B 1/30
[52] U.S. Cl. .................................. 210/96 R; 210/101; 210/103; 210/206
[58] Field of Search ............... 210/96 R, 101, 206, 210/207, 208, 103

[56] References Cited

U.S. PATENT DOCUMENTS

| 793,727 | 4/1905 | Kniffler | 210/101 |
| 2,661,332 | 12/1953 | Moatenson | 210/96 X |
| 2,772,779 | 12/1956 | Norris | 210/96 X |
| 3,238,128 | 3/1966 | Gustafson | 210/96 X |

Primary Examiner—John Adee
Attorney, Agent, or Firm—Brown, Flick & Peckham

[57] ABSTRACT

Lime from a hopper is fed to a lime slurry tank by a variable speed feeder, the tank receiving water from a conduit in which there is a throttle valve and a flowmeter. Slurry from the tank is delivered to a mixing tank that has an inlet for untreated waste water and an outlet for treated waste water. A sensor responsive to the pH of treated waste water leaving the mixing tank controls a device for operating the throttle valve, and the flowmeter controls a device for operating the lime feeder to keep the concentration in the slurry tank substantially constant regardless of the rate of flow out of that tank.

1 Claim, 3 Drawing Figures

APPARATUS FOR INCREASING THE PH OF WASTE WATER

There are situations in which it is desirable to treat waste water in order to increase its Ph and to hold it at a predetermined value. For example, it is desirable to neutralize acid mine drainage in this way. That has been done before, but the apparatus used for the purpose has been unduly expensive and complicated and subject to malfunctioning.

It is among the objects of this invention to provide apparatus to increase the pH of waste water, which is relatively simple in design, which makes use of standard elements that can be purchased on the market, which avoids pumping and throttling a lime slurry, and which eliminates a number of elements that previously were necessary for such apparatus.

The invention is illustrated in the accompanying drawings, in which

Figure 1:
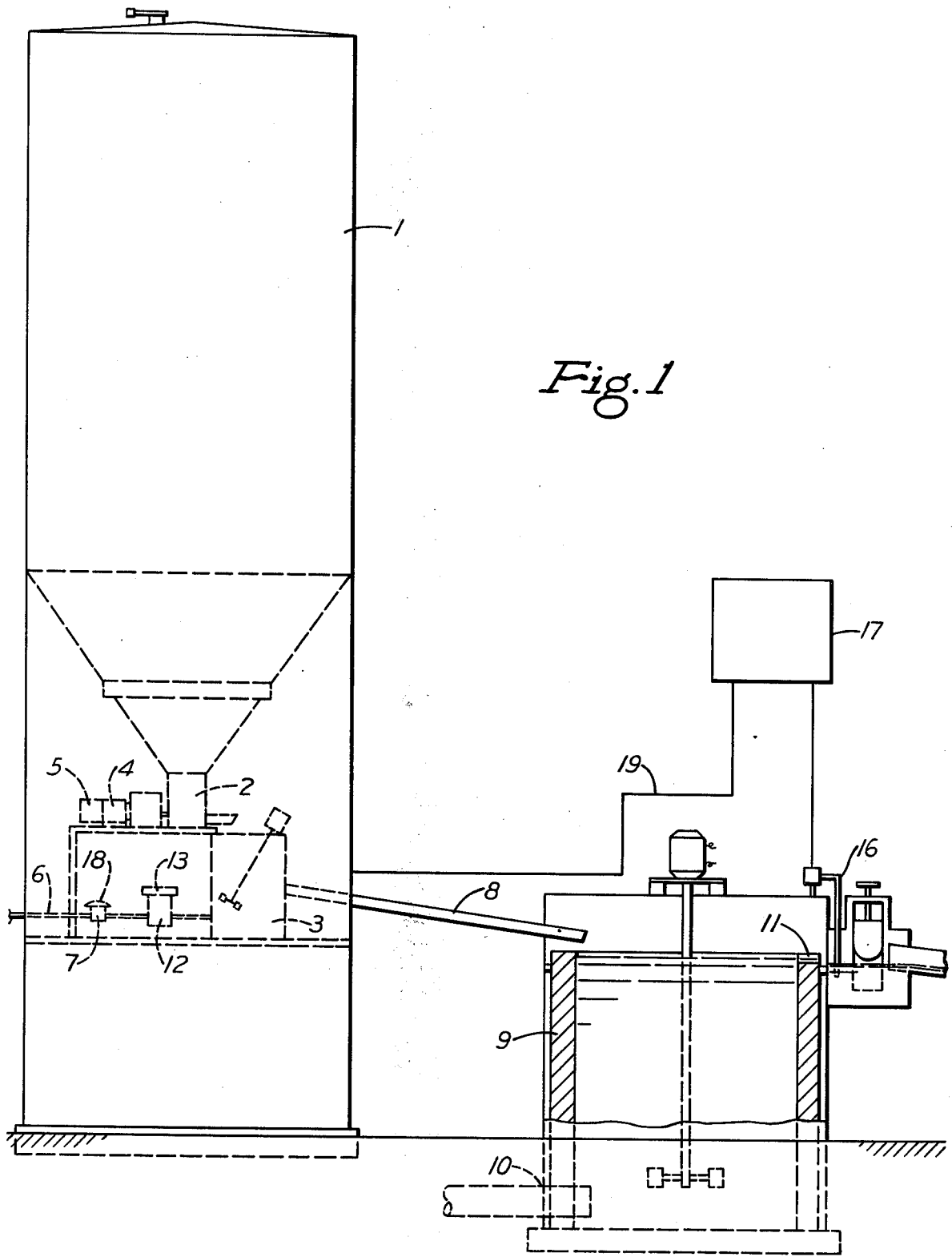
FIG. 1 is a side view with parts broken away in section.
Figure 2:
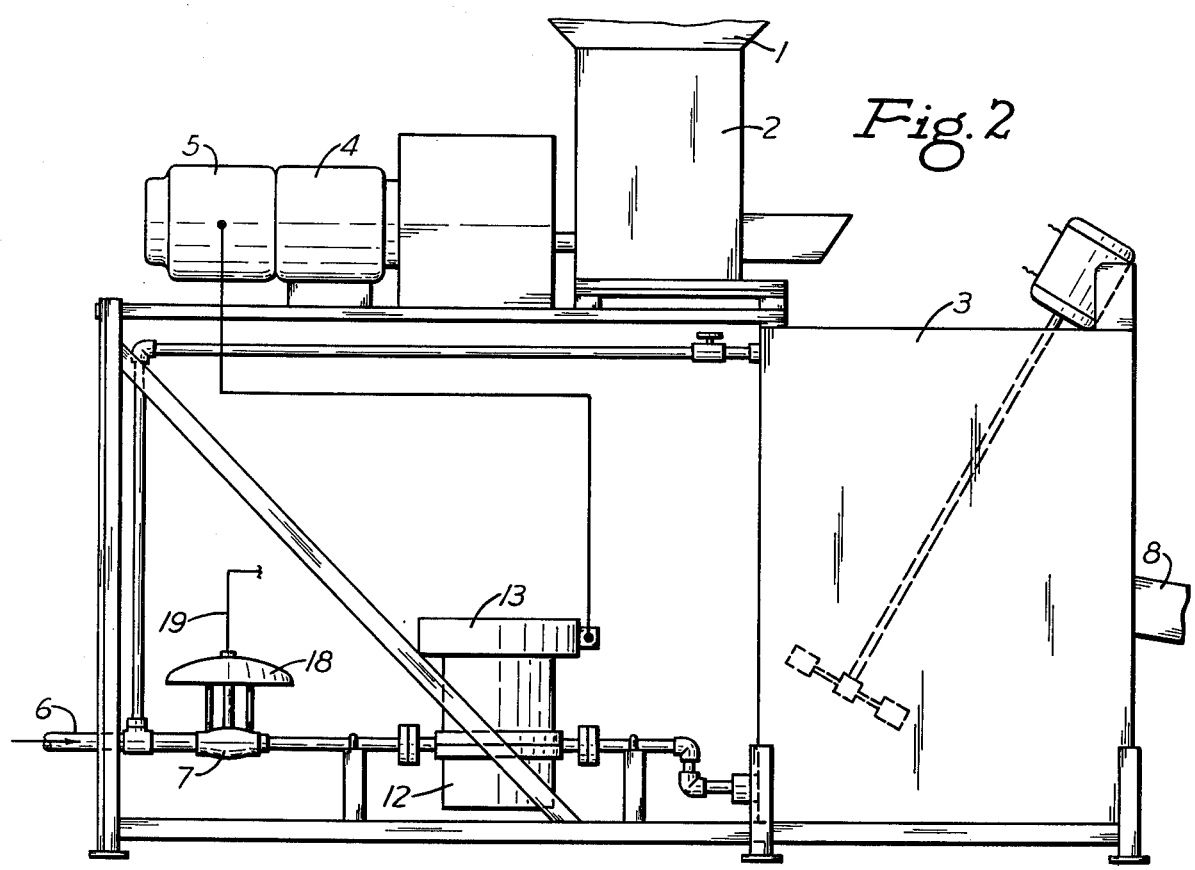
FIG. 2 is an enlarged fragmentary side view.

Referring to FIGS. 1 and 2 of the drawings, a bin or hopper 1 of any desired size is provided for storing lime. Any conventional apparatus can be used for maintaining the desired quantity of lime in the hopper. The outlet at the lower end of the hopper opens into a feeder 2 that can deliver variable amounts of lime, as required, to a lime slurry tank 3. The feeder includes a variable speed conveyor screw or belt (not shown) that receives lime from the hopper and discharges it into the tank. The variable speed motor 4 that drives the conveyor can be controlled by a silicon controlled rectifier control 5 in a well-known manner.

The slurry tank has an inlet for receiving water, herein referred to as fresh water, from a conduit 6 that is provided with a throttle valve 7 that is controlled electrically or pneumatically, for example. The tank also has an overflow outlet, from which the slurry is conducted through a pipe or trough 8 to a much larger mixing tank 9 shown only in FIG. 1. This mixing tank has an inlet 10 for the waste water that is to be treated in the tank, and an outlet 11 for the treated water. In conduit 6 between the throttle valve and the slurry tank there is a flowmeter 12, which sends an electric signal to a signal converter 13. If desired, the converter can be combined with the flowmeter as shown. This converter is wired to the control 5 for the lime feeder in order to control the speed of the feeder.

Immersed in the treated waste water leaving the mixing tank is a pH sensor 16 that is responsive to the alkalinity of the water. The sensor is electrically connected to a conventional recorder-controller 17 having a set point. This instrument can be mounted on a control panel. If the signal from the sensor is either above or below the set point, the controller will send a signal to the throttle valve operator 18 to either open the valve a little more or to close it a little more, as the case may be. The signal can be sent through a line 19 that may be an electrical conductor or a pneumatic tube.

OPERATION

Assuming that the sensor 16 shows that the pH of the water leaving the mixing tank is less than it should be so that lime slurry should be delivered to the mixing tank at a greater rate in order to increase the pH, the throttle valve 7 will be signaled to open further and that will cause more fresh water to be delivered to the slurry tank 3. The increase in rate of flow of water through flowmeter 12 will cause the signal converter 13 to signal the lime feeder 2 to feed lime at a faster rate to the slurry tank. The fresh water feed and the lime feed are coordinated so that the concentration of lime in the slurry tank will remain substantially the same, regardless of the rate of flow of the slurry out of that tank. Because the outlet from the slurry tank is an overflow outlet, the rate of flow of slurry leaving that tank is determined by the rate of flow of fresh water and lime entering the tank.

As an example of the use of this apparatus, the contents of the slurry tank may be 10% by weight slurry of lime in water and this slurry may be fed to the mixing tank at a rate, or in sufficient quantity, to neutralize the waste water by holding its pH at 7 ±0.5. The output of the signal converter 13 is a 4 to 20ma signal and is a straight line function of the fresh water flow, with 4ma representing zero flow and 20ma representing maximum flow. This 4 to 20ma signal is fed into the drive of the lime feeder, where the feeder output is essentially a straight line function of the speed of its driving motor. This assures a uniform concentration in the lime slurry tank.

Figure 3:
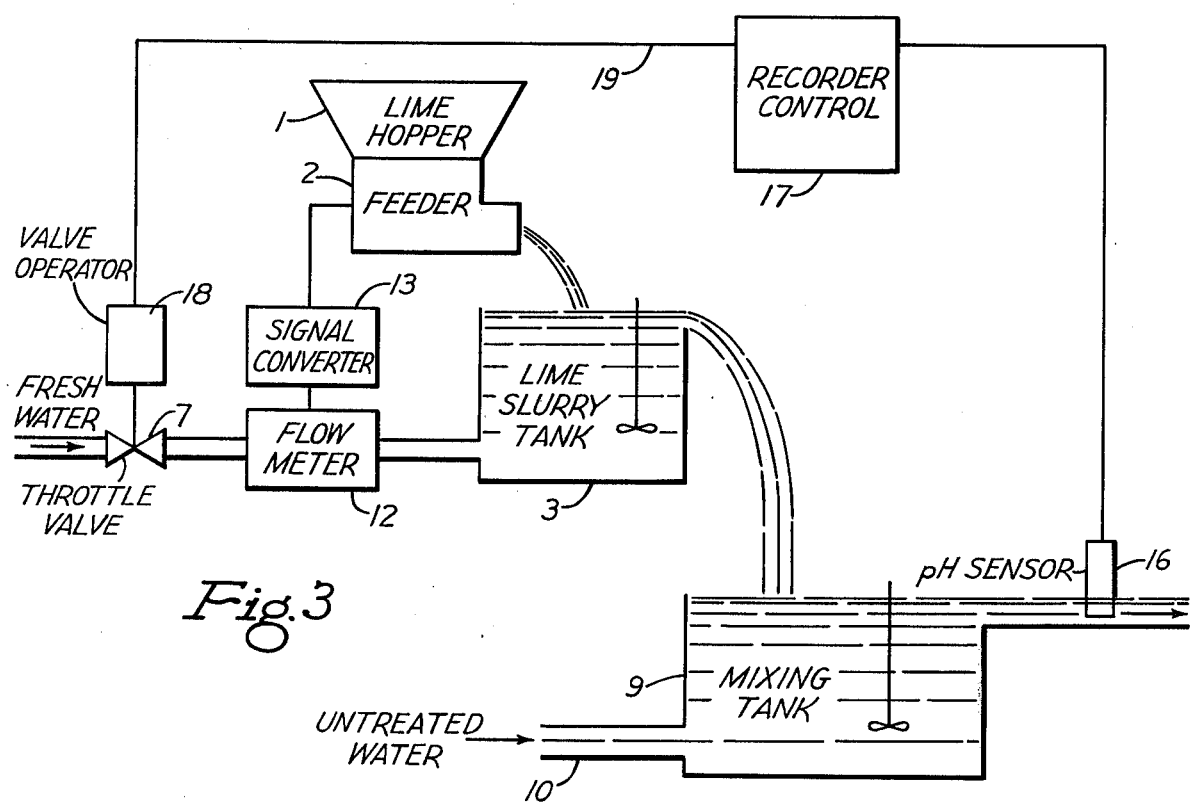
FIG. 3 is a diagram of the apparatus.

It will be seen that the apparatus is relatively simple in construction and operation and that most of its parts are standard elements that are readily available. The relation of the different elements of the apparatus and their operation may be better understood by referring to FIG. 3, where the elements bear identifying legends as well as reference numbers. One of the principal advantages of this invention is the avoidance of pumping and throttling the lime slurry, which would create practical difficulties such as plugging of the throttling valve. In this invention only water flows through the throttling valve and there is no pumping of slurry at all. It simply overflows from the slurry tank into the mixing tank.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for increasing the pH of waste water, comprising a lime water having an outlet, a lime slurry tank having an inlet for water and an overflow outlet, a conduit for delivering water to said slurry tank inlet, a throttle valve in said conduit, a flowmeter in the conduit for measuring the rate of flow therethrough, variable feed means for feeding lime from said hopper outlet to said slurry tank, a mixing tank having an inlet for untreated waste water and an outlet for treated waste water, said mixing tank being positioned to receive slurry from said overflow outlet to mix with waste water in the mixing tank, a sensor responsive to the pH of treated waste water leaving the mixing tank, means controlled by said sensor for operating said throttle valve, and means controlled by the flowmeter for operating said variable feed means to keep the concentration in said slurry tank substantially constant regardless of the rate of flow out of that tank.

* * * * *